A. W. SCHELL.
Machine for Separating or Cleaning Ores.
No. 1,531. Reissued Sept. 1, 1863.
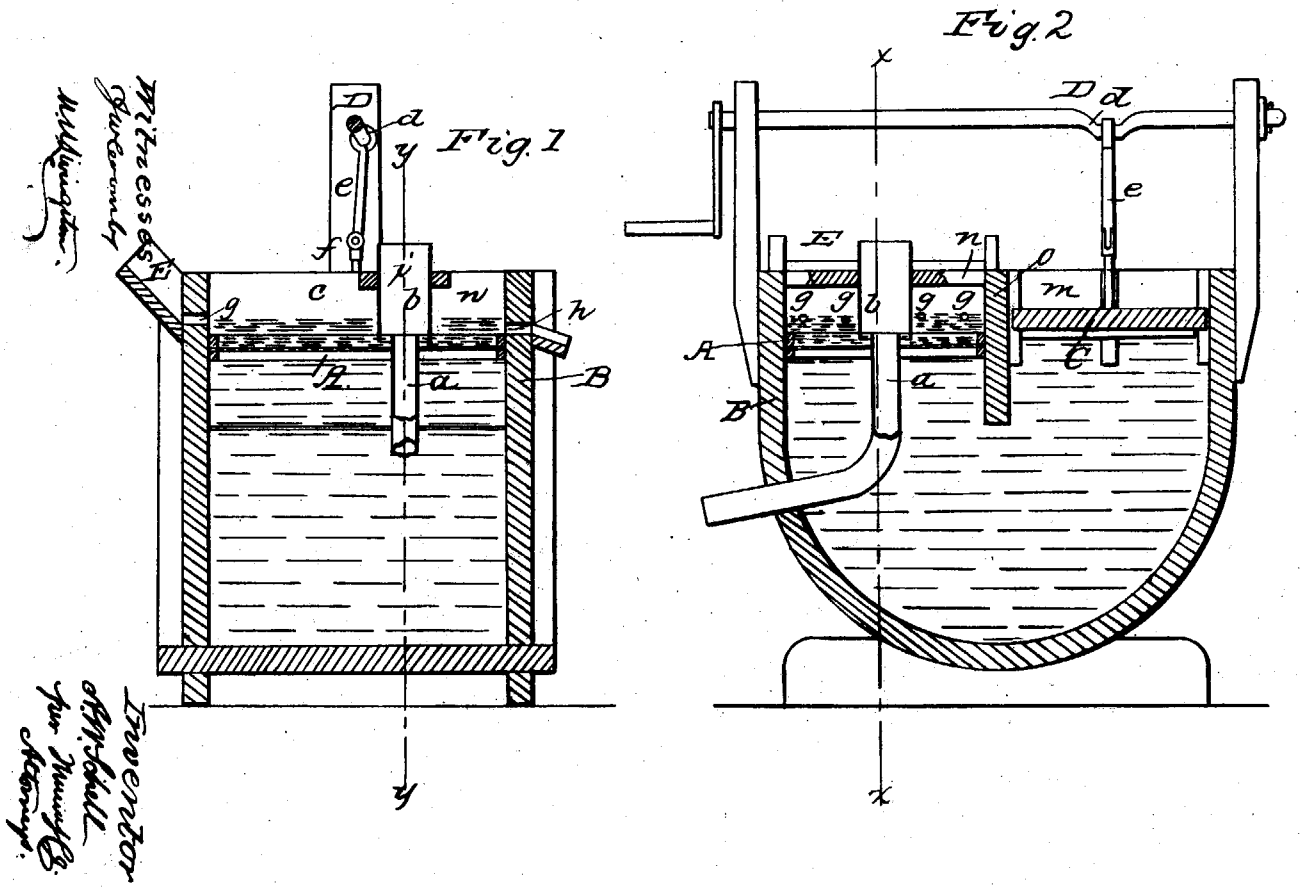
N. PETERS, Photo-Lithographer, Washington, D. C.

UNITED STATES PATENT OFFICE.

GEORGE ASMUS, OF HOUGHTON, MICHIGAN, ASSIGNEE OF AUGUST W. SCHELL.

IMPROVED MACHINE FOR SEPARATING AND CLEANING ORES.

Specification forming part of Letters Patent No. 37,888, dated March 10, 1863; Reissue No. 1,531, dated September 1, 1863.

*To all whom it may concern:*

Be it known that AUGUSTUS W. SCHELL, of Clausthal, in the Kingdom of Hanover, did obtain Letters Patent of the United States for an Improved Shaking-Machine for Separating Ores, which Letters Patent bear date March 10, 1863, and numbered 37,888; and I, GEORGE ASMUS, of Houghton, in the county of Houghton and State of Michigan, having, by assignment duly recorded in the Patent Office, become the sole owner of all the right, title, and interest conveyed under and by said Letters Patent, do hereby declare that the following is a full, clear, and exact description of the said invention, reference being had to the accompanying drawings, forming a part of this specification, in which—

Figure 1 represents a transverse vertical section of said invention, the line *x x*, Fig. 2, indicating the plane of section. Fig. 2 is a longitudinal vertical section of the same, taken in the plane indicated by the line *y y*, Fig. 1, and looking in the direction of the arrow opposite to that line.

Similar letters of reference in both views indicate corresponding parts.

The object of this invention is to separate the different substances contained in auriferous or other ore, according to their specific gravity, simply by the motion of the water and without any attention on the part of the operator.

To enable others skilled in the art to make and use this invention, I will proceed to describe it.

A represents the bottom of a shaking machine, which is secured in any desirable position in a box, B, of wood or any other suitable material. This bottom may be perforated, so that it forms a fine sieve, and in this case the box is divided in two compartments, *n m*, by a vertical partition, *c*, one compartment being occupied by the perforated bottom A and the other by a plunger, C, to which a reciprocating rising-and-falling motion is imparted by means of a crank-shaft, D, the crank *d* of which connects by a rod, *e*, with the stem *f* of the plunger. If the box B is filled with water or other liquid, the motion of the plunger causes the liquid to pass alternately up and down through the perforated bottom A. It is obvious, however, that motion may be imparted to the water in the box B by other means besides those above specified.

The ore may be introduced to the bottom A through a hopper, E, on the side of the box B and through apertures *g*, and it discharges partially through a sluice, *h*, opposite the hopper, and partially through a tube, *a*, which extends up through the bottom A and out through the side of the box B. The orifice of this tube rises from one-half to one inch above the surface of the sieve, according to the size of the ore to be treated, and it is surrounded by a cylindrical jacket, *b*, which is sustained by a cross-bar, *i*, and which extends down to within one-eighth of an inch (more or less) of the bottom A.

The operation is as follows: The grains of ore, which sink to the bottom when the water in the box is in a state of rest, rise and float when the water is in motion, and on precipitating they arrange themselves according to their specific gravity, the heaviest grains below, the lightest on the top. This effect is well known, and it is produced by every shaking machine, whatever may be the means employed to impart motion to the water, but the grains of different specific gravity have to be separated by hand, and the operation requires much time and great care of the operator.

By my apparatus the separation of the grains of different specific gravity is performed automatically in the following manner: At the beginning of the work the bottom A is covered with the heaviest grains contained in the ore to a level with the orifice of the tube *a*, thereby closing the space between the jacket *b* and the bottom. If now the mixed ore is admitted through the hopper, and at the same time motion is imparted to the water in the box, the heaviest grains in the ore arrange themselves below in the ordinary manner, and they mingle with the layer which has been previously spread on the bottom, and which is of equal specific gravity. On account of the continuous motion imparted to this layer with the water, its depth will be uniform throughout, an uneven accumulation of grains at any one spot being impossible, and as soon as the layer becomes deep enough to reach the orifice of the tube *a* the heavy grains commence to discharge through said tube, the lighter grains being prevented from passing under the lower edge of the jacket *b* to the orifice of said tube. The light grains are carried off through the sluice *h*, while those grains which have the desired specific gravity find their way out through the tube *a*. If it is desired to again separate that portion of the ore which discharges through the sluice *h*, said portion is conducted to a second shaking machine of the same construction, the bottom being covered with grains of less specific gravity than that in the first machine, and a second separation takes place precisely in the same manner as above described.

From this description it will be readily understood that by the aid of this apparatus the separation of the ore can be carried on to any desired extent, the operation being effected simply by insulating the layer of the heaviest grains from the succeeding layer of specific lighter grains, said layers being formed by the motion of the ore in water.

I do not claim as new the formation of layers of grains of different specific gravity by imparting to the ore a motion in water; but What I do claim as new, and desire to secure by Letters Patent, is—

1. The employment or use, for the purpose of separating grains, of an apparatus substantially such as herein described, whereby the layer of grains of the greatest specific gravity, formed by imparting to the ore a motion in water, is partially insulated from the next succeeding layer of smaller specific gravity, while at the same time the accretion of the first layer is continually drained off.

2. Insulating either wholly or partially the layer of the heaviest grains from the succeeding layer of specific lighter grains, said layers being formed by the motion of the ore in water, substantially in the manner and for the purpose herein set forth and described.

GEORGE ASMUS.

Witnesses:
WM. H. HENEBRICK,
T. L. CHADBOURNE.